(12) United States Patent
Chiu (10) Patent No.: US 9,084,084 B2
(45) Date of Patent: *Jul. 14, 2015

(54) APPARATUS AND METHOD FOR AUTOMATICALLY REFRESHING A DISPLAY OF A TELEPHONE

(71) Applicant: TP Lab Inc., Palo Alto, CA (US)

(72) Inventor: Shin Cheung Simon Chiu, Palo Alto, CA (US)

(73) Assignee: TP Lab Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/525,638

(22) Filed: Oct. 28, 2014

(65) Prior Publication Data

US 2015/0045071 A1  Feb. 12, 2015

Related U.S. Application Data

(63) Continuation of application No. 11/472,613, filed on Jun. 22, 2006, now Pat. No. 8,903,067.

(51) Int. Cl.
*H04M 3/42* (2006.01)
*H04M 11/04* (2006.01)
(Continued)

(52) U.S. Cl.
CPC ............... *H04W 4/02* (2013.01); *H04L 67/34* (2013.01); *H04M 1/72522* (2013.01); *H04M 1/72583* (2013.01); *H04M 3/487* (2013.01); H04L 67/18 (2013.01); H04L 69/18 (2013.01); H04M 1/2535 (2013.01); H04M 3/42153 (2013.01); H04M 2203/2072 (2013.01); H04M 2242/15 (2013.01)

(58) Field of Classification Search
CPC ....... H04L 67/34; H04L 67/18; H04M 3/487; H04M 2242/15; H04M 2203/2072; H04M 1/2535; H04M 1/72583

USPC ............... 379/201.01, 201.06, 201.1, 207.12, 379/201.04; 455/566, 73, 456.2, 404.2, 455/414.1, 414.2, 456.1, 456.3; 709/233, 709/219

See application file for complete search history.

(56) References Cited

U.S. PATENT DOCUMENTS 6,377,810 B1  4/2002  Geiger
6,983,313 B1  1/2006  Korkea-aho
(Continued)

OTHER PUBLICATIONS

Office action of corresponding U.S. Appl. No. 11/472,613, dated Jun. 8, 2010.
(Continued)

*Primary Examiner* — Thjuan K Addy
(74) *Attorney, Agent, or Firm* — Timothy X. Gibson, Esq.; Gibson & Dernier LLP (57) ABSTRACT

Methods and apparatus for refreshing a display of a telephone. A telephone apparatus includes a telephone having a display panel and function by which a user can access a plurality of communication services provided over a communication network. The function may represent a given set of conditions associated with a user, such as static and variable conditions. The function is typically associated with one or more commonly used communication services that would be used by a user under a given set of conditions. A method for automatically refreshing a screen on a display panel of a telephone based on a function change includes displaying on a telephone display a first screen based on a function, the display representing a commonly used communication service associated with the function, and selecting a function based on information.

20 Claims, 5 Drawing Sheets

(51) Int. Cl.
*H04W 24/00* (2009.01)
*H04M 3/487* (2006.01)
*H04M 1/725* (2006.01)
*H04M 1/253* (2006.01)
*H04L 29/08* (2006.01)
*H04L 29/06* (2006.01)
*H04W 4/02* (2009.01)

(56) References Cited

U.S. PATENT DOCUMENTS

| | | | |
|---|---|---|---|
| 7,386,279 | B2 | 6/2008 | Wagner |
| 7,500,198 | B2 * | 3/2009 | Mathews et al. ............. 715/744 |
| 2002/0194359 | A1 | 12/2002 | Little |
| 2004/0259598 | A1 | 12/2004 | Wagner |

OTHER PUBLICATIONS

Office action of corresponding U.S. Appl. No. 11/472,613, dated Nov. 9, 2010.
Office action of corresponding U.S. Appl. No. 11/472,613, dated Jun. 28, 2011.
Office action of corresponding U.S. Appl. No. 11/472,613, dated Nov. 10, 2011.
Office action of corresponding U.S. Appl. No. 11/472,613, dated Aug. 30, 2013.
Office action of corresponding U.S. Appl. No. 11/472,613, dated Jan. 9, 2014.

\* cited by examiner

APPARATUS AND METHOD FOR AUTOMATICALLY REFRESHING A DISPLAY OF A TELEPHONE

CROSS-REFERENCE TO RELATED APPLICATIONS

This application is a continuation of U.S. patent application Ser. No. 11/472,613 filed Jun. 22, 2006, the entirety of which is incorporated herein by reference.

BACKGROUND OF THE INVENTION

This invention relates generally to telecommunications, and more specifically to apparatus and methods for automatically refreshing a display screen of a telephone.

A telephone allows a user to use many services including personal communication services, such as telephone services, conference services, voice messaging services, and directory services, such as yellow page services. Telephones also permit access to and use of information services, such as stock quote services, weather services, traffic condition services and the like; and commercial services, such as fund transfer services, movie ticketing services or merchandise ordering services and the like.

A typical telephone has a display panel and navigation keys to help a user to find and use a service. Due to the many available services, the user often has to navigate through many menu displays in order to find a desired service.

Users often access the same services at the same time every day, or use some services more routinely than others, and tend to do so at certain times of day more so than at other times. In addition, such users might be disposed to access certain services depending on their location, such as while using public transportation, or while shopping in a mall.

By way of illustration, a user may be a working single parent, preparing in the morning for a long working day. The user uses his or her home phone to check local weather and traffic information for the daily commute route to school and to work. The user also uses a school bulletin board service to listen to school event announcements in the morning for his or her two children. In the evening after work, the user checks his voice messages, and listens to world news and sports headlines. Oftentimes, this user uses a local restaurant directory to order take-out for his children. Each time the user uses his home phone to access a service, he has to navigate painstakingly through the menu in order to find the right service.

It would be desirable for users such as the one described above that when a user picks up the home phone to use a service in the morning, the home phone is already displaying the service the user typically accesses at that time of day. Similarly, it would be desirable that when the user wants to use a different service in the evening, the user's home phone is already displaying the different service.

In another example, a user takes a commuter train to a shopping mall in the city every day. She uses her mobile phone to purchase the train ticket. While in a commuter train, the user typically listens to a music channel on her mobile phone. While at the mall, the user checks on her mobile phone the shopping mall directory for merchant information, such as location, business promotion, or event schedule. Frequently, this exemplary user will use her mobile phone to buy a ticket for the cinema in the shopping mall. It would be desirable for her mobile phone to display the services that she uses when she is at the train station, and displays the mall services when she is at the mall.

Based on the above discussion, there is a need to provide a solution for a telephone to automatically display services that are likely to be used at a given time and/or in a given location by a particular user.

SUMMARY OF THE INVENTION

Methods and apparatus for refreshing a display of a telephone are disclosed. A telephone apparatus in accordance with one embodiment of the present invention includes a telephone having a display panel and function by which a user can access a plurality of communication services. The plurality of communication services are provided over a communication network.

In accordance with one embodiment the function represents a given set of conditions associated with a user. Conditions may be static, such as user ID, or variable, such as time, location, activity or the like. Examples of the function may include an office worker on weekday morning, a hotel guest in evenings, or a vehicle driver. As discussed in further detail hereinbelow, the function is associated with one or more commonly used communication services that would be used by a user under a given set of conditions.

In one embodiment, the function includes a function key that includes information such as but not limited to time or location information.

In one embodiment a process for automatically refreshing a screen on a display panel based on a function change is provided. The process includes displaying on a telephone display a first screen based on a first function. The first screen includes at least one display item, with each display item representing a commonly used communication service associated with the first function.

In accordance with a further embodiment, a telephone includes a function selector that selects a function. The telephone refreshes the screen on the display panel by displaying a subsequent or second screen on the display panel, replacing or refreshing the first screen. The second screen includes at least one display item, with each display item representing a commonly used communication service associated with the function.

In accordance with another embodiment a process is provided in which a function selector selects a function based on time. In one embodiment, a telephone further includes a datastore including at least one function. The function selector connects to the datastore. Further, the function selector connects to a clock which may be programmable, and which may further be programmed to contain information correlated to a calendar of events, such as holidays.

In one embodiment the function selector may include a processor. In a preferred embodiment the function selector is programmed to select a function from a datastore based on time of day.

In accordance with another embodiment a process is provided in which a function selector selects a function based on location. In one embodiment, a function selector selects a function based on a location of a telephone. Preferably the function selector connects to a datastore including at least one function and further connects to a location server. Function selector preferably obtains a location of a telephone from the location server. In one embodiment the function selector is programmed to select a function from the datastore based on a location of telephone.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE INVENTION

In the following description, for the purposes of explanation, specific numbers, materials and configurations are set forth in order to provide a thorough understanding of the invention. It will be apparent, however, to a person of ordinary skill in the art, that these specific details are merely exemplary embodiments of the invention. In some instances, well known features may be omitted or simplified so as not to obscure the present invention. Furthermore, reference in the specification to "one embodiment" or "an embodiment" is not meant to limit the scope of the invention, but instead merely provides an example of a particular feature, structure or characteristic of the invention described in connection with the embodiment. Insofar as various embodiments are described herein, the appearances of the phase "in an embodiment" in various places in the specification are not meant to refer to a single or same embodiment.

Figure 1:
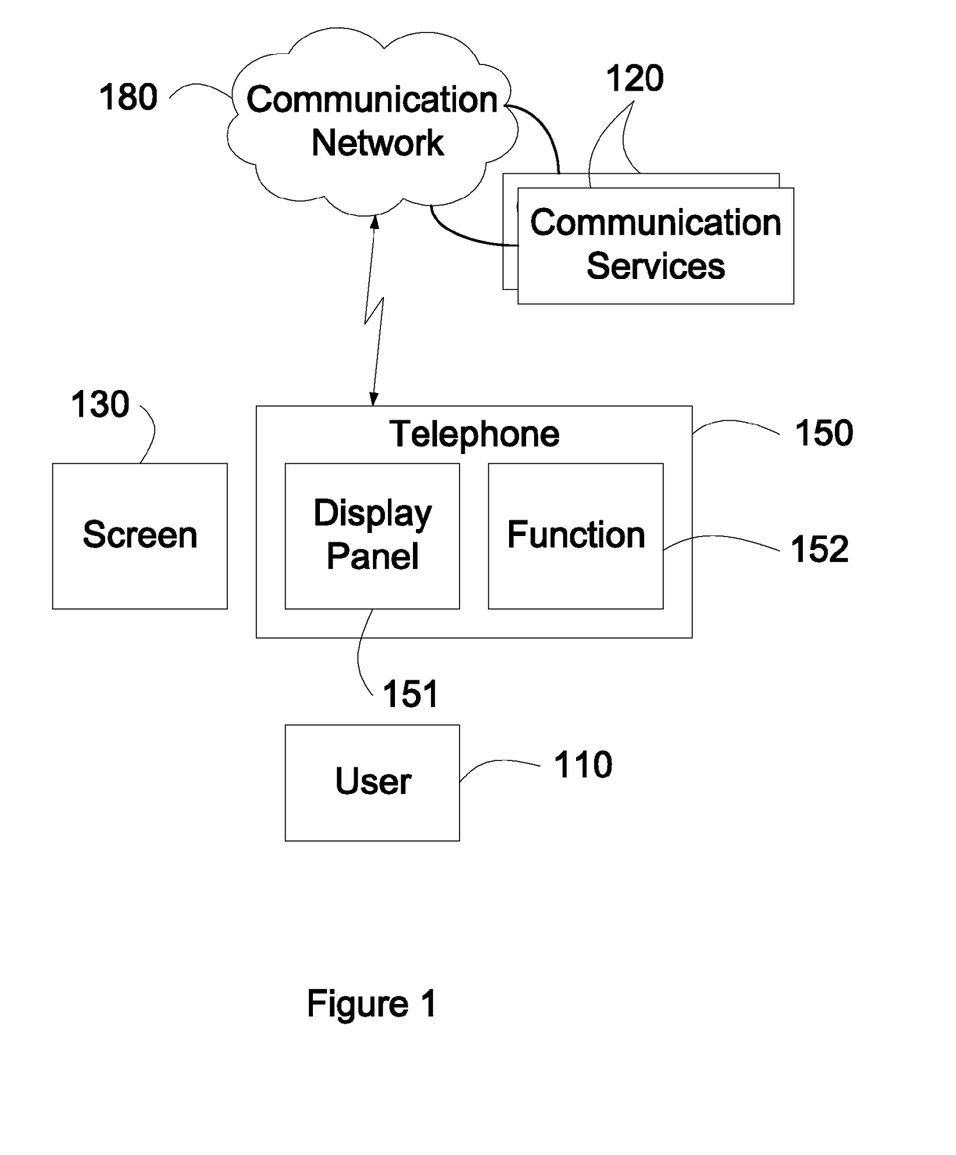
FIG. 1 illustrates a simplified block diagram of a telephone in accordance with one embodiment of the present invention.

With reference to the drawings, wherein like numerals indicate like elements, there is shown in FIG. 1 in accordance with at least one embodiment, a simplified block diagram depicting a telephone 150 having a display panel 151 and function 152.

Telephone 150 allows the usage of a plurality of communication services 120 by user 110. The plurality of communication services 120 are provided over a communication network 180.

In accordance with at least one embodiment, communication services 120 may be selected from a local telephone service or a long distance telephone service, a voice message service, an Instant Message (IM) based or a Voice over IP based voice service, a commercial transaction service, such as but not limited to a ticketing service or a phone banking service, a group call service, a hot-line telephone service, a directory service, a yellow page service, a reminder service, such as an automatic wakeup call service, a conference call reminder, or an appointment reminder service; an information service, such as a news headlines service, a local weather report service, a road condition service, a stock quote service; or an emergency alert service, such as a flood warning service or a child abduction alert service. It will be apparent to those having skill in the art a wide range of services can be considered communications services 120 in accordance with the teachings of the present invention.

In accordance with at least one embodiment, communication network 180 includes a telephone network, such as but not limited to a Public Switched Telephone Network (PSTN), a corporate telephone network or a Voice over IP (VoIP) network. Communication network 180 may include an Internet Protocol (IP) network, a wide area network (WAN) or local area network (LAN), the Internet, a corporate Virtual Private Network (VPN), a wired network, such as an Ethernet, and/or a wireless network, such as a General Packet Radio Service (GPRS) network, a Global System for Mobile Communications (GSM) network, or a WiFi network. Further examples of a communication network 180 include a Code Division Multiple Access One (cdmaOne) network, CDMA2000 network, Wideband Code Division Multiple Access (W-CDMA) network, third-generation (3G) network, CDMA 1x Evolution-Data Optimized (1xEV-DO) network, High-Speed Downlink Packet Access (HSDPA) network, and Enhanced Data Rates for GSM Evolution (EDGE) network.

Telephone 150 includes a display panel 151. In one embodiment, display panel 151 is adapted to display items including text and/or graphics. Display panel 151 may have any suitable dimensions. In one embodiment, display panel 151 has a vertical dimension of 4 inches and a horizontal dimension of 6 inches. In another embodiment, display panel 151 has a vertical dimension of 2 inches and a horizontal dimension of 1.5 inches. In one embodiment, display panel 151 has a diagonal dimension of 2.5 inches.

Function 152 represents a given set of conditions associated with a user 110. Conditions may be static, such as user ID, or variable, such as time, location, activity or the like. Examples of function 152 may be an office worker on weekday morning, a hotel guest in evenings, or a vehicle driver. As discussed in further detail hereinbelow, now referring to FIG. 2, function 152 is associated with one or more commonly used communication services 207 selected from communication services 120 that would be used by a user 110 under a given set of conditions.

Figure 2:
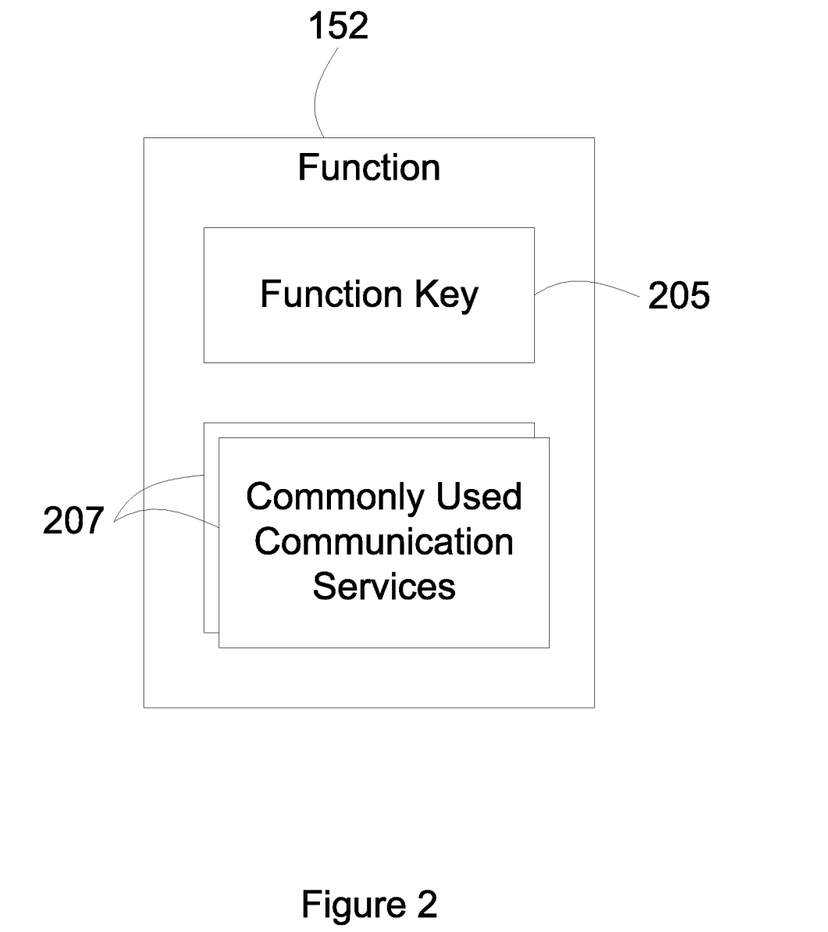
FIG. 2 illustrates a simplified block diagram of a function in accordance with one embodiment of the present invention.

By way of example, function 152 may represent an office worker on workday mornings, such as 8:00 am to 10:00 am, Monday to Friday. In accordance with this and perhaps other embodiments, function 152 may be associated with commonly used communication services 207 such as a voice message service, a collaboration service, or a conferencing service that the particular user is apt to use under the conditions, i.e., an office worker in the morning between 8:00 am and 10:00 am.

In another exemplary mode, function 152 may represent an office worker's role in workday evenings, such as from 6:00 pm to 8:00 pm Monday to Friday. In accordance with this and perhaps other embodiments, the commonly used communication services 207 may include a voice message service, a supper ordering service, or a next-day conference scheduling service.

In yet another exemplary mode, function 152 may represent a parent's role in early mornings, such as 6:00 am to 7:30 am. In accordance with at least this and perhaps another embodiment, the commonly used communication services 207 may include a local weather information service, a local traffic condition information service, or a school activity bulletin board service.

In accordance with a further example, function 152 may represent a vehicle driver's role. In accordance with at least one embodiment, the commonly used communication services 207 may include a traffic condition information service, a food and lodging merchant directory service, or a road emergency hotline call service.

In yet a further example, function 152 may represent a shopper's role at a shopping mall. In accordance with at least one embodiment, the commonly used communication services 207 may include an event information service provided by the shopping mall, a shopping mall business directory service, or an instant coupon promotion service for a merchant at the shopping mall.

In other examples, function 152 may represent the role of a high school student during weekday evenings; a college student; a small business merchant; a patient in a hospital or in a rehabilitation center; a guest in a hotel; or a worker in a warehouse. In another embodiment, a function 152 may represent a seasonal event or holiday, such as but not limited to Mother's Day, Valentine Day, Super Bowl weekend, Christmas, Halloween, Thanksgiving Day or the like.

Referring to FIG. 1, in one embodiment telephone 150 displays a screen 130 on display panel 151 based on function 152. Screen 130 includes information about the commonly used communication services 207 (shown in FIG. 2) associated with function 152. In one embodiment, the information includes a textual or a graphical representation of a commonly used communication service 207. In one embodiment, the information includes an operation menu for a commonly used communication service 207.

Now referring to FIG. 2 a function 152 is illustrated in accordance with one embodiment of the present invention. In accordance with at least one embodiment, a function 152 includes at least one function key 205 including information; and is associated with at least one commonly used communication service 207.

In one embodiment, function key 205 includes time information. Time information may be any time frame. For example, time information may include a specific time of day, such as 8:30 am, 6:15 pm, or 9:00 am on Jul. 22, 2006; a time period, such as from 10:00 am to 1:00 pm, Aug. 15 to Aug. 22, 2006, or 12:30 pm on December 16 to 9:00 pm on December 26; and/or a recurring time, such as every Monday, Monday to Friday at 6:30 am, every Saturday and Sunday, or every Wednesday and Friday at 8:00 pm. It will be apparent to the skilled artisan the foregoing are merely exemplary and not intended to limit the scope of the present invention.

In one embodiment, function key 205 includes location information. Location information may be any location. For example, and not by way of limitation, in one embodiment, the location information includes the name of a geographical region, a city, a building, or a neighborhood. In another embodiment, the location information includes a floor number of a building, an office number, a conference room number, or a cubicle number. In yet another embodiment, the location information includes the identity of a shopping mall, an airport, a hospital, a movie theatre, a freeway exit, or a train station. In one embodiment, the location information includes geographic information, such as longitude, latitude and altitude information. In one embodiment, the location information includes cellular coverage information, such as an identity of a radio base station. In one embodiment, the location information includes a location type, such as a vehicle, a train, a ferry, a mall, a government building, or a truck of a delivery service company. It will be apparent to the skilled artisan the foregoing are merely exemplary and not intended to limit the scope of the present invention.

Figure 3:
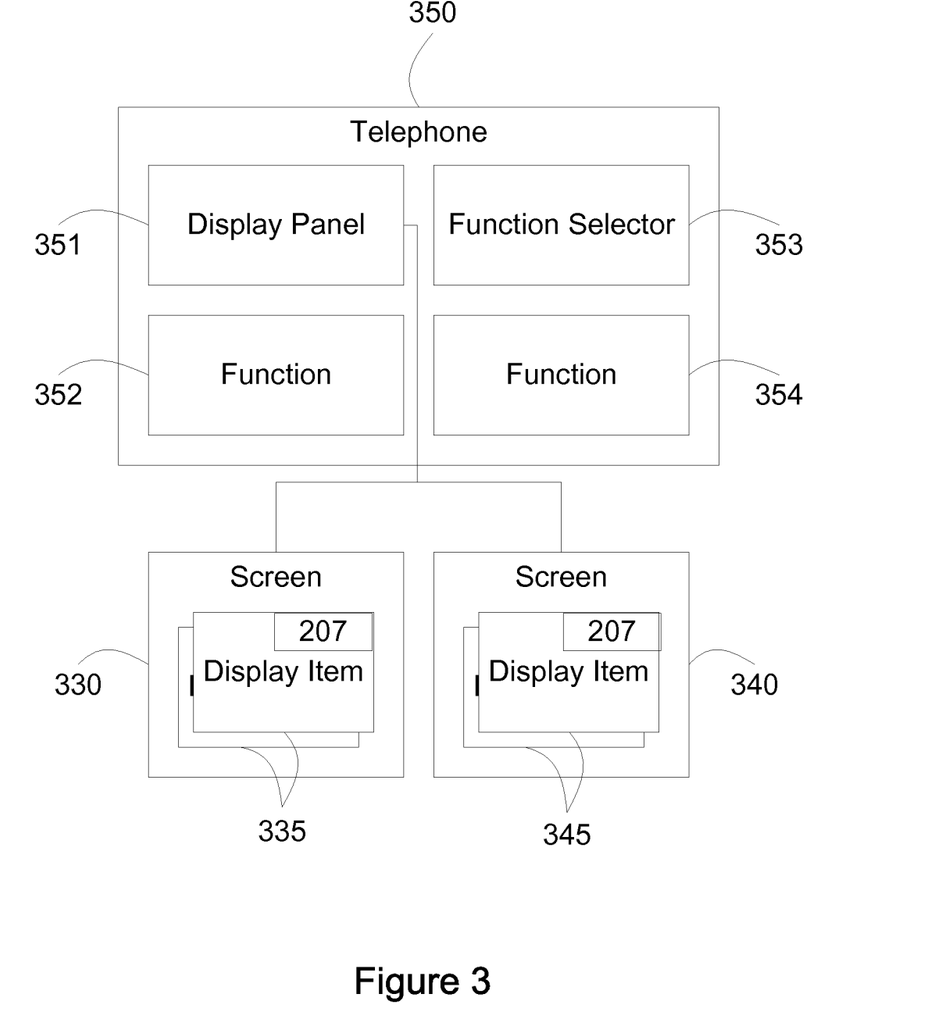
FIG. 3 illustrates an exemplary embodiment of screen refreshing of a telephone in accordance with one embodiment of the present invention.

Now referring to FIG. 3, an exemplary process is disclosed for a telephone 350 to automatically refresh a display panel 351 based on a change of function 352 to 354.

Telephone 350 displays a first screen 330 on display panel 351 based on a first function 352. The first screen 330 includes at least one display item 335, with each display item 335 representing a commonly used communication service 207 associated with the first function 352.

Figure 4:
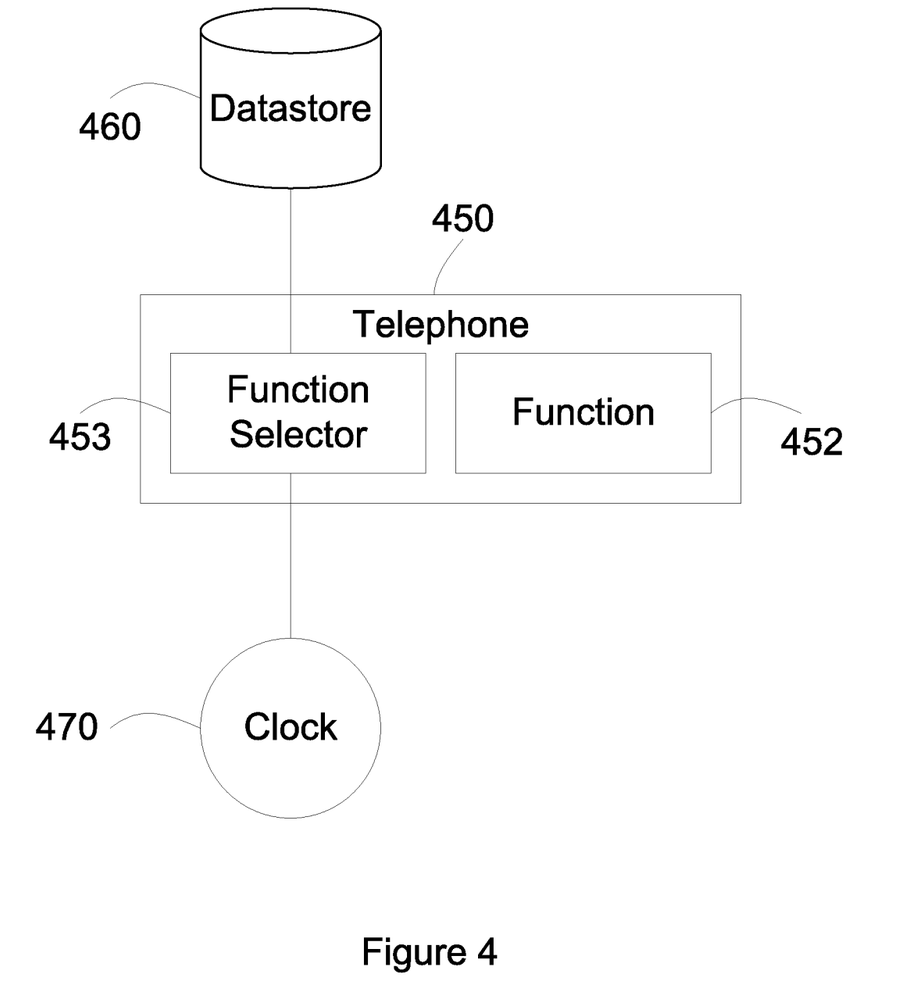
FIG. 4 illustrates an exemplary screen refreshing process in accordance with one embodiment of the present invention.
Figure 5:
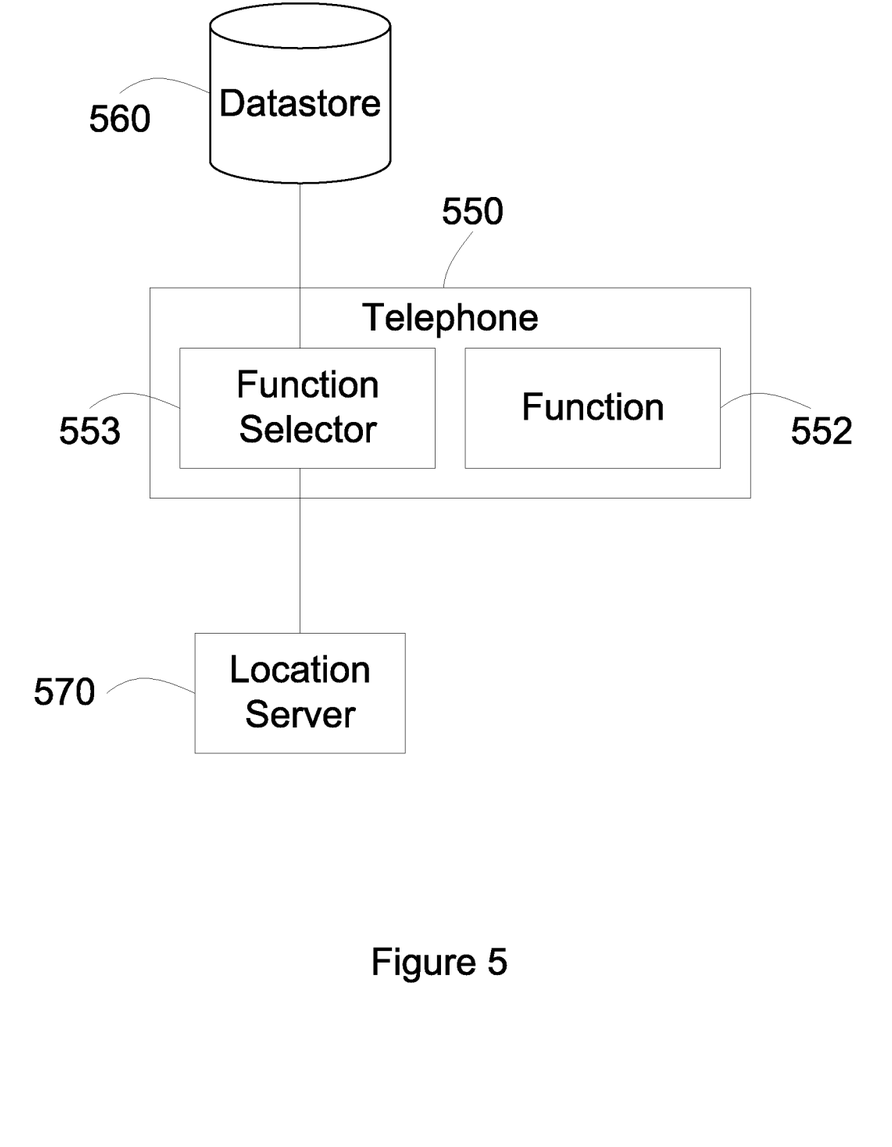
FIG. 5 illustrates an exemplary screen refreshing process in accordance with one embodiment of the present invention.

Telephone 350 includes a function selector 353. Function selector 353 is preferably a program or programming logic that selects a function 352 based on information, such as time (as illustrated in FIG. 4), or location (as illustrated in FIG. 5). Function selector 353 uses the information to select a function 352 matching the information with at least one stored function 352, 354. Functions may be stored in a datastore, discussed further hereinbelow. In a preferred embodiment the function selector 353 selects the function 352 and the telephone 350 refreshes the screen 330 based on the selected function 352. The function selector 353 of telephone 350 may select a second function 354, and successive functions, in the same way.

Telephone 350 refreshes a screen 330 of a display panel 351 by displaying a second screen 340 on display panel 351, replacing or refreshing the first screen 330. The second screen 340 includes at least one display item 345, with each display item 345 representing a commonly used communication service 207 associated with the second function 354.

In one embodiment, second function 354 is the same as first function 352 in which event the second screen 340 is the same as first screen 330.

Now referring to FIG. 4 a process is depicted for function selector 453 to select a function 452 based on time. In one embodiment, telephone 450 includes datastore 460. Datastore 460 includes at least one function 452. Datastore 460 may include a hard disk, a memory, a flash memory and/or a database or other suitable storage means. Function selector 453 connects to a datastore 460.

Function selector 453 connects to a clock 470. Clock 470 provides the time of day information. In one embodiment clock 470 may be programmed to contain information correlated to a calendar of events, such as holidays.

In one embodiment function selector 453 is programmed to select a function 452 by selecting a function 452 from datastore 460 based on time of day.

Function selector 453 obtains the time of day from clock 470. Function selector 453 matches the obtained time of day with the one or more functions 452 in datastore 460. In one embodiment, function selector 453 selects a function 452 wherein the time information of function 452 matches the time of day.

In one embodiment, function selector 453 is programmed to select a function periodically, such as every 10 seconds, every 35 seconds, every minute, or every 5 minutes. In one embodiment, function selector 453 selects a function 452 at random times.

Now referring to FIG. 5 a process is depicted wherein function selector 553 selects a function 552 based on location. In one embodiment function selector 553 selects a function 552 based on location of telephone 550.

In one embodiment, function selector 553 connects to datastore 560. Datastore 560 includes at least one function 552. Function selector 553 connects to a location server 570. Function selector 553 obtains location of telephone 550 from location server 570. Function selector 553 is programmed to select a function 552 such as by selecting a function 552 from datastore 560 based on location of telephone 550.

In one embodiment, function selector 553 connects to location server 570 over a network such as an IP based network, the Internet, a corporate VPN, or a cellular data network, such as General Packet Radio Service (GPRS) network. In another embodiment, function selector 553 connects to location server 570 over a WiFi hotspot, or a short-distance wireless network, such as a Bluetooth network. In another embodiment, function selector 553 connects to location server 570 over a global location satellite network, a cellular network, such as a Global System for Mobile Communications (GSM) network, or over a programming interface.

In one embodiment, the location of telephone 550 may include the name of a location, such as but not limited to a city, a building, or a neighborhood; a floor number of a building, an office number, a conference room number, or a cubicle number; the name or identifying information of a shopping mall, an airport, a hospital, a movie theatre, a freeway exit, or a train station; geographic information, such as longitude, latitude and altitude information; cellular coverage information, such as an identity of a radio base station; a location type, such as a vehicle, a train, a ferry, a mall, a government building, or a truck of a delivery service company; or the like. It will be apparent to the skilled artisan the foregoing are merely exemplary and not intended to limit the scope of the present invention.

In accordance with one embodiment, function selector 553 obtains a location of telephone 550 from location server 570. Function selector 553 matches the obtained location with the one or more functions 552 in datastore 560. In one embodiment, function selector 553 selects function 552 wherein the location information of function 552 matches the obtained location.

In one embodiment, function selector 553 selects a function 552 periodically, such as every 30 seconds, every minute, or every 4 minutes. In one embodiment, function selector 553 selects a function at random times.

In one embodiment, function selector 553 selects a function 552 when the location of telephone 550 has changed. In one embodiment, location server 570 informs function selector 553 that the location of telephone 550 has changed.

Now referring to FIG. 3, in accordance with one mode of practice of the present invention, a telephone 350 is a residential telephone. A first function 352 represents morning usage of the residential telephone 350. A first set of commonly used communication services 207 associated with the first function 352 include local weather information service, school bulletin board service, and local traffic information service. A second function 354 represents evening usage of the residential telephone 350. A second set of commonly used communication services 207 associated with the second function 354 include voice mail, news, local restaurant directory service, and movie ticketing service. When the residential telephone 350 determines the time is past 5 pm, the telephone 350 displays on display panel 351 a screen 340 including the second set of commonly used communication services 207. When the residential telephone 350 determines the time is past 5 am, it displays on display panel 351 a screen 330 the first set of communication services 207.

In one embodiment, a telephone is a mobile phone used in an office, where the display refreshes with a new set of commonly used communication services when the telephone is moved from a cubicle to a conference room, or from inside an office building to a parking lot.

In one embodiment, a telephone 350 is an office telephone where the display panel 351 shows one set of commonly used communication services 207 during normal working hours and another set of commonly used communication services 207 during after hours.

In another exemplary embodiment, a telephone 350 is a personal mobile phone where the display panel 351 shows a first set of commonly used communication services 207 during weekdays, a second set of commonly used communication services 207 during weekends, a third set of commonly used communication services 207 during holidays, and a fourth set of commonly used communication services 207 during an out-of-town vacation.

In another example, a telephone 350 is a hotel guest mobile phone where the display panel 351 shows a first set of commonly used communication services 207 while inside a guest room, a second set of commonly used communication services 207 while at a pool side or a gym, a third set of commonly used communication services 207 while in a hotel casino, and a fourth set of commonly used communication services 207 while in the vicinity of a hotel theatre.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A conferencing system comprising a display panel, a processor, a telephone coupled to a voice network, the display panel and the processor, and a datastore comprising at least one function comprising information relating to a current location of the telephone and a user of the telephone, wherein the at least one function is associated with at least one conferencing communication service, wherein the processor is operable to connect the telephone to a location server to obtain a current location of the telephone, select a function from the datastore, and refresh a screen on the display panel to include the at least one conferencing communication service associated with the selected function based on the current location of the telephone.

2. The conferencing system of claim 1 wherein the processor is operable to refresh the screen to include at least one conferencing communication service associated with a second function when there is a change of the current location of the telephone.

3. The conferencing system of claim 2 wherein the processor is operable to connect the telephone to the location server to obtain the changed current location of the telephone.

4. The conferencing system of claim 2 wherein the telephone is movable between different locations.

5. The conferencing system of claim 4 wherein the telephone is movable via a vehicle, a train, or a ferry.

6. The conferencing system of claim 4 wherein the telephone is movable within a city, along a street, within a neighborhood, and/or within a building.

7. The conferencing system of claim 4 wherein the telephone is movable from a given location to a location in a shopping mall, a hospital, a building, an airport, an office, a cube, a floor of a building, and/or to a room.

8. The conferencing system of claim 1 wherein the at least one function further relates to a current time.

9. The conferencing system of claim 8 wherein the processor is operable to refresh the screen to include at least one conferencing communication service associated with a second function when there is a change of the current time.

10. The conferencing system of claim 1 wherein the processor is operable to refresh the screen to include at least one conferencing communication service associated with a second function when there is a change of user.

11. A method of refreshing a display panel of a conferencing system, the conferencing system comprising a display panel, a processor, a telephone coupled to a voice network, the display panel and the processor, and a datastore comprising at least one function comprising information relating to a current location of the telephone and a user of the telephone, wherein the at least one function is associated with at least one conferencing communication service, comprising the steps of obtaining a current location of the telephone using a location server, selecting a function from the datastore, and refreshing a screen on the display panel to include the at least one conferencing communication service associated with the selected function based on the current location of the telephone.

12. The method of claim 11 further comprising refreshing the screen to include at least one conferencing communication service associated with a second function when there is a change of the current location of the telephone.

13. The method of claim 12 comprising obtaining a changed location of the telephone from the location server.

14. The method of claim 12 comprising moving the telephone between different locations.

15. The method of claim 14 comprising moving the telephone via a vehicle, a train, or a ferry.

16. The method of claim 14 comprising moving the telephone within a city, along a street, within a neighborhood, and/or within a building.

17. The method of claim 14 comprising moving the telephone from a given location to a location in a shopping mall, a hospital, a building, an airport, an office, a cube, a floor of a building, and/or to a room.

18. The method of claim 11 wherein the at least one function further relates to a current time.

19. The method of claim 18 further comprising refreshing the screen to include at least one conferencing communication service associated with a second function when there is a change of the current location or the current time.

20. The method of claim 11 comprising refreshing the screen to include at least one conferencing communication service associated with a second function when there is a change of user.

* * * * *